United States Patent [19]

Jaffe et al.

[11] Patent Number: 4,810,304

[45] Date of Patent: Mar. 7, 1989

[54] SOLID SOLUTIONS OF PYRROLO-(3,4-C)-PYRROLES WITH QUINACRIDONES

[75] Inventors: Edward E. Jaffe, Wilmington, Del.; Fridolin Bäbler, Marly, Switzerland

[73] Assignee: Ciba-Geigy Corporation, Ardsley, N.Y.

[21] Appl. No.: 119,523

[22] Filed: Nov. 12, 1987

Related U.S. Application Data

[63] Continuation-in-part of Ser. No. 9,868, Feb. 2, 1987, abandoned.

[51] Int. Cl.[4] ............................................. C08K 5/00
[52] U.S. Cl. .................................. 106/494; 106/412; 106/493; 106/495; 548/453
[58] Field of Search ............... 106/412, 493, 494, 495; 546/271, 58; 548/453, 455; 544/296, 333

[56] References Cited

U.S. PATENT DOCUMENTS

| | | | |
|---|---|---|---|
| 3,160,510 | 12/1964 | Ehrich | 106/288 Q |
| 3,341,345 | 9/1967 | Ehrich | 106/288 Q |
| 3,681,100 | 8/1972 | Jaffe | 106/288 Q |
| 4,385,174 | 5/1983 | Iqbal et al. | 548/471 |
| 4,415,685 | 11/1983 | Iqbal et al. | 524/92 |
| 4,490,542 | 12/1984 | Iqbal et al. | 548/453 |
| 4,500,718 | 2/1985 | Roehat et al. | 548/455 |
| 4,585,878 | 4/1986 | Jost et al. | 548/453 |
| 4,613,669 | 9/1986 | Cassar et al. | 548/453 |
| 4,632,704 | 12/1986 | Babler | 106/288 Q |

Primary Examiner—Paul Lieberman
Assistant Examiner—Willie J. Thompson
Attorney, Agent, or Firm—Harry Falber

[57] ABSTRACT

Solid solutions of pyrrolo-[3,4-c]-pyrroles and quinacridones which contain (a) at least one compound of the formulae

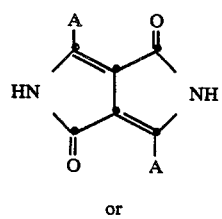

(I)

or

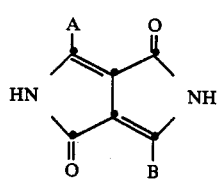

(II)

in which A and B are independently of each other one of the groups of the formulae

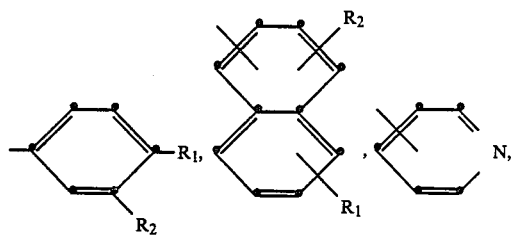

in which $R_1$ and $R_2$ are independently of each other hydrogen, halogen, $C_1$–$C_5$-alkyl, $C_1$–$C_5$-alkoxy, —$SR_3$, —$N(R_3)_2$—$CF_3$, —CN or a group of the formulae $R_3$ is $C_1$–$C_5$-alkyl and $R_4$ and $R_5$ are independently of each other hydrogen, halogen, $C_1$–$C_5$-alkyl, $C_1$–$C_5$-alkoxy, —$SR_3$ or —CN, and (b) at least one linear quinacridone compound of the formulae

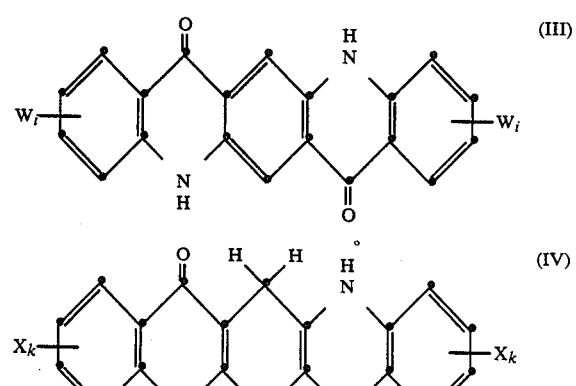

(List continued on next page.)

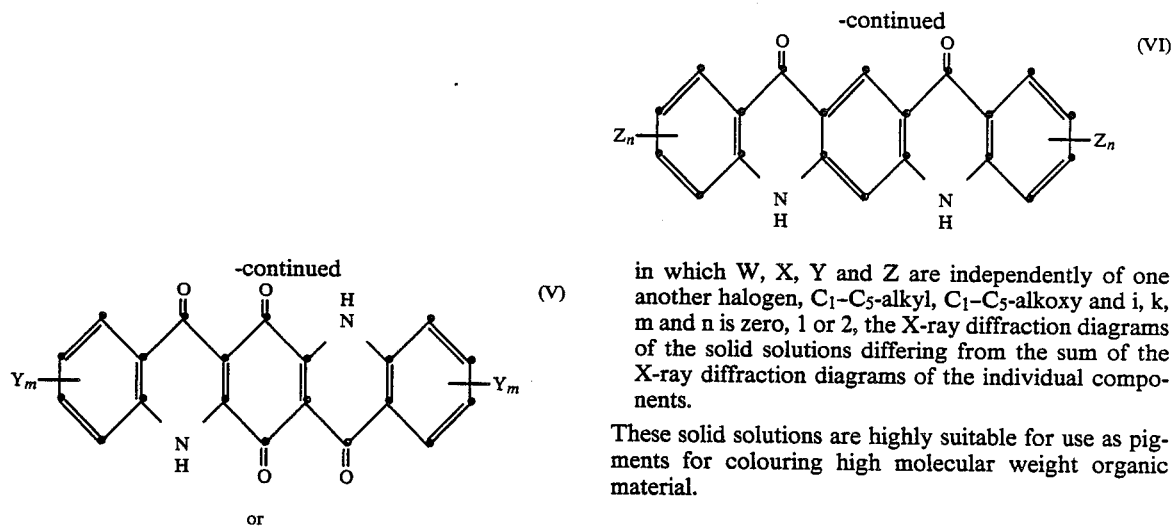

in which W, X, Y and Z are independently of one another halogen, $C_1$–$C_5$-alkyl, $C_1$–$C_5$-alkoxy and i, k, m and n is zero, 1 or 2, the X-ray diffraction diagrams of the solid solutions differing from the sum of the X-ray diffraction diagrams of the individual components.

These solid solutions are highly suitable for use as pigments for colouring high molecular weight organic material.

10 Claims, No Drawings

SOLID SOLUTIONS OF PYRROLO-(3,4-C)-PYRROLES WITH QUINACRIDONES

CROSS REFERENCE

This is a continuation-in-part of our application Ser. No. 009,868 filed Feb. 2, 1987, now abandoned.

The present invention relates to solid solutions of 1,4-diketopyrrolo-[3,4-c]-pyrroles with quinacridones.

It is known that, under certain preconditions, solid solutions having improved properties can be obtained with two or more pigments of the same class. For instance, U.S. Pat. Nos. 3,160,510, 3,298,847, 3,647,494 and 3,681,100 describe solid solutions of quinacridone pigments, and U.S. Pat. No. 3,554,776 and German Offenlegungsschriften No. 2,009,073, 3,436,206, 3,436,208 and 3,436,209 describe solid solutions of perylenetetracarbimides. U.S. Pat. No. 4,286,998 describes solid solutions of quinacridonequinone pigments with 2-anilinoacridone which is not itself a pigment. It is also known from U.S. Pat. No. 3,341,345 that solid solutions of certain quinacridones with specific N,N'-diaryldiamino compounds which are not in lhemselves pigments too have an improved light fastness.

The use of pyrrolo-[3,4-c]-pyrroles as pigments is known for example from U.S. Pat. No. 4,415,685. These compounds have in general been found to be pigments of excellent quality which, however, are not always wholly satisfactory, depending on the field of use.

It has now been found that certain pyrrolo-[3,4-c]pyrroles surprisingly combine with pigments of a totally different class, namely with quinacridones, to form solid solutions having improved pigmentary properties.

The present invention accordingly relates to solid solutions of pyrrolo-[3,4-c]-pyrroles and quinacridones con- taining (a) at least one compound of the formulae

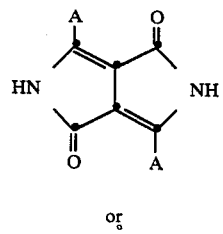
(I)

or

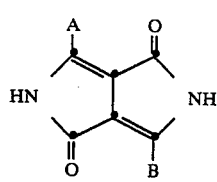
(II)

in which A and B are independently of each other one of the groups of the formulae

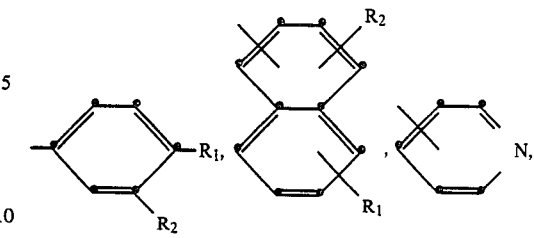

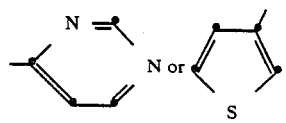

in which $R_1$ and $R_2$ are independently of each other hydrogen, halogen, $C_1$-$C_5$-alkyl, $C_1$-$C_5$-alkoxy, —$SR_3$, —$N(R_3)_2$ —$CF_3$, —CN or a group of the formulae

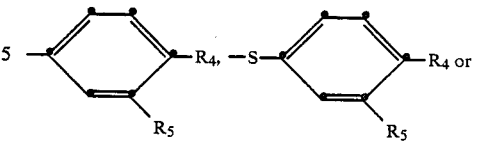

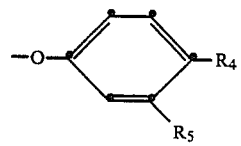

$R_3$ is $C_1$-$C_5$-alkyl and $R_4$ and $R_5$ are independently of each other hydrogen, halogen, $C_1$-$C_5$-alkyl, $C_1$-$C_5$-alkoxy, —$SR_3$ or —CN, and (b) at least one linear quinacridone compound of the formulae

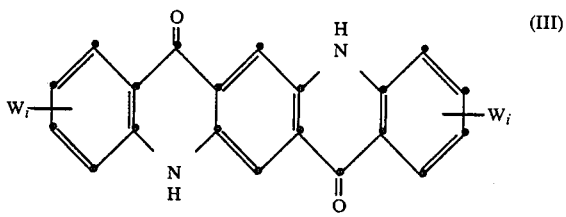
(III)

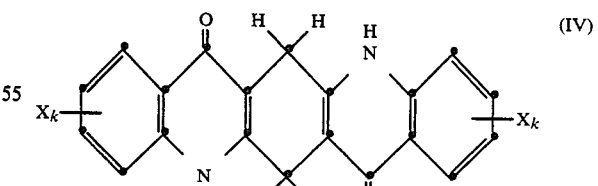
(IV)

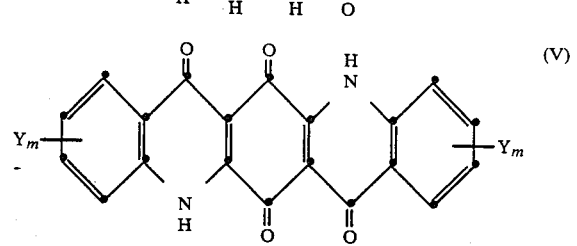
(V)

-continued or

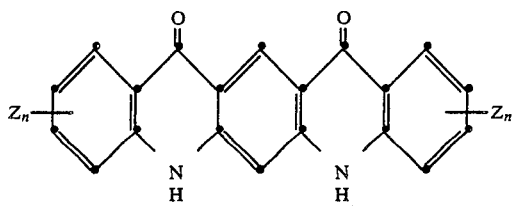
(VI)

in which W, X, Y and Z are independently of one another halogen, $C_1$–$C_5$-alkyl, $C_1$–$C_5$-alkoxy and i, k, m and n is zero, 1 or 2, the X-ray diffraction diagrams of the solid solutions differing from the sum of the X-ray diffraction diagrams of the individual components.

Any halogen substituents are, for example, fluorine, preferably bromine and in particular chlorine.

Any $C_1$–$C_5$-alkyl substituents are, for example, methyl, ethyl, n-propyl, isopropyl, n-butyl, sec.-butyl, tert.-butyl, n-pentyl, isopentyl, neopentyl or tert.-pentyl.

Any $C_1$–$C_5$-alkoxy substituents are, for example, methoxy, ethoxy, n-propoxy, n-butoxy, sec.-butoxy, n-pentyloxy, isopentyloxy or neopentyloxy.

Particular interest is given to solid solutions containing at least one compound of the formulae or II with the abovementioned meaning and a quinacridone compound of the formula III in which W is chlorine or methyl and i is zero or 1;.

solid solutions containing at least one compound of the formulae I or II with the abovementioned meaning, a quinacridone compound of the formula V in which m is zero and a quinacridone compound of the formula IV in which k is zero;

solid solutions containing at least one compound of the formulae I or II with the abovementioned meaning, a quinacridone compound of the formula V in which m is zero and a quinacridone compound of the formula III in which i is zero;

solid solutions containing at least one compound of the formulae I and II with the abovementioned meaning, and one each of a quinacridone compound of the formulae III, IV and V, in which i, k and m are zero.

Very particular interest is given to solid solutions according to the invention which contain a compound of the formula I with the abovementioned meaning and at least one compound of the formulae III, IV, V or VI with the first-mentioned meaning.

Preference is given to solid solutions according to the invention which contain a compound of the formula I in which A is a group of the formulae

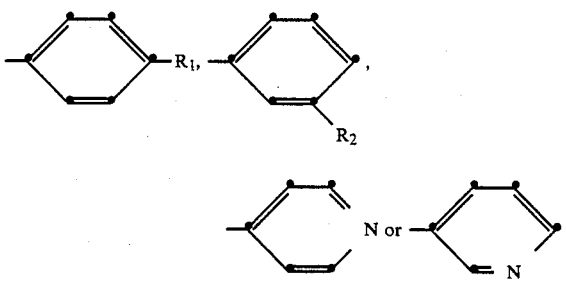

in which $R_1$ is hydrogen, chlorine, bromine, cyano, methyl, ethyl, tert.-butyl or phenyl and $R_2$ is hydrogen, chlorine, methyl or cyano.

Particular preference is given to a solid solution containing the two compounds of the formulae

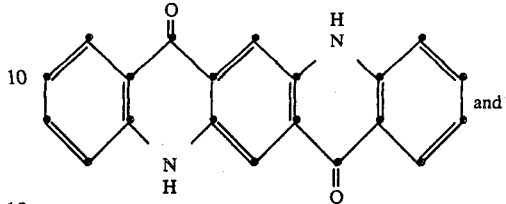 and

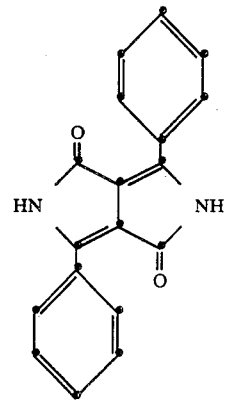

In the solid solutions according to the invention, the ratio of

I and/or II:III and/or IV and/or V and/or VI is expediently 5–95:95–5, preferably 10–90:90–10, % by weight.

Quinacridonequinones of the formula V form particularly readily solid solutions with compounds of the formulae I and II. The improvement in the pigmentary properties is most pronounced with such quinacridonequinone-containing solid solutions when they contain mixtures of quinacridonequinones of the formula V with quinacridones of the formula III and/or of the formula IV. Of these, preference is given to mixtures which contain per 1 part by weight of quinacridonequinone of the formula V 0.05–0,75 part by weight of quinacridone of the formula III and/or IV.

Although the solid solutions thus obtained have very good light and weathering fastness properties, it is possible in certain cases, by adding selected additives, such as certain metal salts, for example basic $NiCO_3$ or $MnCO_3$, or organic compounds, such as anilinoacridone, before, after or during the formation of the solid solutions, to improve these fastness properties still further. To this end it is expedient to add 2–20% by weight of additives, based on the solid solution. The pigments thus obtained have excellent light and weathering fastness properties which fully meet, for example, the industrial requirements with respect to automotive coatings.

The solid solutions according to the invention can be prepared starting from physical mixtures of the above-defined components of the formulae I and/or II with III and/or IV and/or V and/or VI by the following, perfectly conventional methods:

by contacting in polar organic solvents, preferably by stirring the component mixture under reflux;

by alkaline reprecipitation of the component mixture in polar organic solvents or by stirring the same in polar organic solvents in the presence of bases, such as alcoholates, alkali hydroxides or quaternary ammonium compounds;

by acid reprecipitation, i.e. dissolving the component mixture in acid and precipitating the solid solution by diluting with water, or by thoroughly grinding or kneading the component mixture, if desired with subsequent recrystallization in water and/or organic solvents.

Suitable polar organic solvents in whose presence the individual components are contacted to form the solid solutions according to the invention are for example dimethylformamide, N-methylformamide, tetramethylurea, dimethylacetamide, N-methylpyrrolidone, dimethyl sulfoxide, tetramethylene sulfone, glacial acetic acid, ketones, such as cyclohexanone, alcohols, such as n-butanol, cyclohexanol or benzyl alcohol, furthermore ethylene glycol, propylene glycol, ethers, such as ethylene glycol dimethyl ether, diphenyl ether or anisole, as well as aromatic hydrocarbons, such as nitrobenzene, chlorobenzene, dichlorobenzene, trichlorobenzene, toluenes and xylenes or esters, such as ethyl acetate or butyl acetate.

In the alkaline reprecipitation, the physical mixture of individual components is dissolved in a polar organic solvent, preferably an alcohol of the formula $C_rH_{2r+1}$—OH, in which r is a whole number from 1 to 5, by adding an at least equivalent amount of a base, for example an Na-alcoholate, for example Na-methylate, -ethylate, -isopropylate or -tert.-amylate, dimethylamine, sodium hydroxide solution, potassium hydroxide solution or ammonia, whereafter the solid solution is precipitated by diluting with water or by adding a mineral or organic acid, such as hydrochloric acid, sulfuric acid or acetic acid.

Suitable for the acid reprecipitation are in particular sulfuric and polyphosphoric acid. The pigment obtained in this way is very finely crystalline and therefore is preferably recrystallized by heating the acid aqueous pigment suspension with or without organic solvent.

Preferably the solid solutions according to the invention are prepared starting from the physical component mixtures by grinding or kneading, for example salt kneading in the presence of an organic solvent such as diacetone alcohol.

Particularly preferred grinding methods are dry grinding, dry salt grinding, grinding in an organic solvent and/or water. The grinding bodies used therein can be metal, glass or ceramic balls, plastics granules or sand grains as commonly customary for pigments.

The grinding and kneading is expediently carried out at temperatures between 5° and 90° C., preferably between 15° and 60° C.

In dry salt grinding preference is given to using sodium chloride, $CaCl_2$, $Na_2SO_4$ or $Al_2(SO_4)_3$ with or without crystal water. For every 100 to 150 parts by weight of salt, for example 10 to 50 parts by weight of pigment are used. In this mode of grinding, it can be of advantage to add to the grinding medium small amounts of solvents such as xylene or tetrachloroethylene and/or surfactants, for, example sodium or isopropylammonium salt of dodecylbenzenesulfonic acid. Working up is effected in a method known per se by separating the pigment/salt mixture from the grinding aids, adding it to water and then filtering off the pigment suspension obtained.

Aqueous grindings of the physical pigment mixtures can be carried out with or without grinding aids of the type described for example in EP-A-No. 101,666. It can be of advantage here to shift the pH value from the neutral into the acid or alkaline range.

Although the solid solutions according to the invention have excellent application properties, it can be of advantage to add texture improving agents to the pigment.

Suitable texture improving agents are, for example, fatty acids having at least 12C atoms, such as stearic acid or behenic acid, amides, esters or salts thereof, such as magnesium stearate, zinc stearate, aluminium stearate or magnesium behenate, furthermore quaternary ammonium compounds, such as tri-($C_1$–$C_4$)-alkylbenzylammonium salts, furthermore plasticizers, such as epoxidized soya bean oil, waxes, such as polyethylene wax, resin acids, such as abietic acid, rosin soap, hydrogenated or dimerized rosin, $C_{12}$–$C_{18}$-paraffindisulfonic acids, alkylphenols or alcohols, such as stearyl alcohol, furthermore laurylamine or stearylamine, and aliphatic 1,2-diols, such as dodecane-1,2-diol.

Preferred texture improving agents are laurylamine, stearylamine, aliphatic 1,2-diols, stearic acids, amides, salts or esters thereof, epoxidized soya bean oil, waxes or resin acids.

These additives can be added in amounts of 0.05 to 20, preferably 1 to 10, % by weight, based on the solid solution pigment, before, during or after the formation thereof.

Solid solutions can be characterized by means of their X-ray diffraction diagram, which differs from that of the physical mixture of the two individual components. The X-ray diffraction diagram of the solid solutions according to the invention is characterized by different lines than the sum of the X-ray diffraction diagrams of the individual components.

The solid solutions according to the invention are highly suitable for use as pigments for colouring high molecular weight organic material. They have different colouristic properties from the starting pigments and, depending on the method of preparation, can be present in transparent or hiding form. By thermal aftertreatment in organic solvents they can be for example readily recrystallized, i.e. the result obtained is a hiding form of uniform pigment particle size and shape. Preferably the organic solvents used are for example benzenes which are substituted by halogen atoms or alkyl or nitro groups, such as xylenes, chlorobenzene, o-dichlorobenzene or nitrobenzene, as well as pyridine bases, such as pyridine, picoline or quinoline, furthermore ketones such as cyclohexanone, alcohols, such as isopropanol, butanols, pentanols or tricyclodecane alcohols, ethers, such as ethylene glycol monomethyl or monoethyl ether, amides, such as dimethylformamide or N-methylpyrrolidone, and also dimethyl sulfoxide or sulfolane.

High molecular weight organic materials which can be coloured or pigmented with the solid solutions according to the invention are, for example, cellulose ethers and esters, such as ethylcellulose, nitrocellulose, cellulose acetate or cellulose butyrate, natural and synthetic resins, such as polymerization or condensation resins, such as amino resins, in particular urea- and melamine-formaldehyde resins, alkyd resins, phenolic resins, polycarbonates, polyurethanes, polystyrene, polyvinyl chloride, polyamides, polyolefines, polyesters, ABS, polyphenylene oxide, rubber, caseine, silicone and silicone resins, individually or mixed.

The solid solutions according to the invention are particularly suitable for colouring polyvinyl chloride and polyolefines, such as polyethylene and polypropylene, and for pigmenting lacquers and paints, in particular automotive topcoats.

Useful new shades can be obtained with the solid solutions of the invention in admixture with other pigments. In transparent form they are also preeminently suitable for obtaining metallized finishes.

The high molecular weight organic compounds mentioned can be present individually or in mixtures as plastic materials, melts or in the form of spinning solutions, lacquers, paints or printing inks. Depending on the intended use, it is found to be advantageous to use the solid solutions according to the invention as toners or in the form of preparations.

Based on the high molecular weight organic material to be pigmented, the solid solutions according to the invention can be used in an amount of 0.01 to 30% by weight, preferably 0.1 to 10% by weight.

The high molecular weight organic substances are pigmented with the solid solutions according to the invention for example by mixing such a solid solution, if desired in the form of a masterbatch, into these substrates using roll mills and mixing or grinding apparatuses. The pigmented material is then brought into the desired final form by methods known per se, such as calendering, pressing, extruding, brushing, casting or injection moulding. To produce non-rigid mouldings or to reduce their brittleness, it is frequently desirable to incorporate plasticizers into the high molecular weight compounds before the shaping operation. Suitable plasticizers are for example esters of phosphoric acid, phthalic acid or sebacic acid. Plasticizers can be incorporated before or after the incorporation of the solid solutions according to the invention into the polymers. To obtain different shades, it is further possible to add to the high molecular weight organic substances, in addition to the solid solutions according to the invention, also fillers or other colouring constituents, such as white, coloured or black pigments, in any desired amounts.

For the pigmenting of lacquers, paints and printing inks, the high molecular weight organic materials and the solid solutions according to the invention, if desired together with additives, such as fillers, other pigments, siccatives or plasticizers, are finely dispersed or dissolved in a common organic solvent or solvent mixture. This can be done by dispersing or dissolving the individual components by themselves or in groups together and only then combining all the components.

In colourings, for example of polyvinyl chloride or polyolefines, the solid solutions according to the invention exhibit good general pigment properties, such as high dispersibility, high tinctorial strength and purity and high migration, heat, light and weathering fastness properties.

The examples below illustrate the invention.

EXAMPLE 1

A ball mill which has a capacity of about 1 liter and contains 1.5 kg of steel balls (diameter: 1.2 cm) and 150 g of nails (length 3 cm) as grinding bodies is charged with 11.5 g of γ-quinacridone, 3.5 g of 3,6-diphenyl-1,4-diketopyrrolo-[3,4-c]-pyrrole, 2.4 ml of tetrachloroethylene, 0.75 g of the Na salt of benzenedodecylsulfonic acid and 135 g of aluminium sulfate [$Al_2(SO_4)_3 \cdot 15-18 \ H_2O$]. The carefully sealed mill is rolled for 72 hours on a roll stand at room temperature. The mill base is then separated from the grinding bodies and is stirred in a solution of 2.75 ml of concentrated sulfuric acid in 500 ml of water for 2 hours at 70° C. The pigment is filtered off, the press cake is washed with hot water until neutral and salt-free and is dried at 80° C. in a vacuum drying cabinet, and the material obtained is pulverized. This gives 13.5 g of a red solid solution pigment whose X-ray diffraction diagram differs from the X-ray diffraction diagram of the corresponding physical mixture of the abovementioned starting materials. On incorporation in plastics and paints, strong red colourings having excellent fastness properties are obtained.

The same good results are obtained if an equivalent amount of the isopropylammonium salt of benzenedodecylsulfonic acid is used instead of the corresponding Na salt.

EXAMPLE 2

45.6 g of γ-quinacridone and 14.4 g of 3,6-diphenyl-1,4-diketopyrrolo-[3,4-c]-pyrrole are dissolved in 200 ml of concentrated sulfuric acid at room temperature by stirring for 2½ hours. The sulfuric acid solution is forced under nitrogen pressure in a mixing nozzle into water. The following temperatures are measured: pigment in sulfuric acid solution: 27° C., water: 25° C., effluent from mixing nozzle: 50° C. The acid pigment suspension obtained is cooled to 35° C. and is stirred at that temperature for 1½ hours. The suspension is then filtered off, the press cake is washed with water until neutral and is dried at 80° C. in a vacuum drying cabinet, and the material obtained is pulverized. This gives 57 g of a red solid solution pigment whose X-ray diffraction diagram differs from the X-ray diffraction diagram of the corresponding physical mixture of the abovementioned starting materials. On incorporation into plastics and paints, strong red colourings having excellent fastness properties are obtained.

EXAMPLE 3

Example 1 is repeated, except that the isolated solid solution pigment is recrystallized by stirring same in n-butanol at room temperature for 4 hours, affording a red solid solution pigment whose X-ray diffraction diagram differs from the X-ray diffraction diagram of the corresponding physical mixture of the abovementioned starting materials. In automotive finishes the pigment exhibits very good rheological properties, and the corresponding coatings are highly weathering-resistant.

EXAMPLE 4

Example 1 is repeated, except that the 11.5 g of γ-quinacridone are replaced by 3.9 g of 2,9-dichloroquinacridone and the 3.5 g of 3,6-diphenyl-1,4-diketopyrrolo-[3,4-c]-pyrrole by 11.1 g of 3,6-di(4-chlorophenyl)-1,4-diketopyrrolo-[3,4-c]-pyrrole, affording a red solid solution pigment whose X-ray diffraction diagram differs from the X-ray diffraction diagram of the corresponding physical mixture of the abovementioned starting materials. On incorporation into plastics and paints, very strong red colourings of high saturation and transparency with excellent fastness properties are obtained.

EXAMPLE 5

Example 1 is repeated, except that the 11.5 g of γ-quinacridone are replaced by 11.7 g of quinacridonequinone and the 3.5 g by 3.3 g of 3,6-diphenyl-1,4-diketopyrrolo-[3,4-c]-pyrrole, affording 14.5 g of an orange-coloured solid solution pigment whose X-ray diffraction diagram differs from X-ray diffraction diagram of the corresponding physical mixture of the abovementioned starting materials. In plastics and paints this solid solution pigment produces very strong orange colourings having excellent fastness properties.

EXAMPLE 6

Example 5 is repeated, except that the 11.7 g are replaced by 11.6 g of quinacridonequinone and the 3.3 g by 3.4 g of 3,6-di(4-methylphenyl)-1,4-diketopyrrolo-[3,4-c]-pyrrole, affording an orange-coloured solid solution pigment whose X-ray diffraction diagram differs from the X-ray diffraction diagram of the corresponding physical mixture of the abovementioned starting materials. In plastics and paints this solid solution pigment produces strong orange colourings having good fastness properties.

EXAMPLE 7

Example 5 is repeated, except that the 11.7 g are replaced by 8.1 g of quinacridonequinone and the 3.3 g by 6.9 g of 3,6-diphenyl-1,4-diketopyrrolo-[3,4-c]-pyrrole, affording an orange-coloured solid solution pigment whose X-ray diffraction diagram differs from the X-ray diffraction diagram of the corresponding physical mixture of the above-mentioned starting materials. In plastics and paints this solid solution pigment produces strong reddish orange colourings having excellent fastness properties.

EXAMPLE 8

In a glass vessel, 6 g of quinacridonequinone, 1.5 g of 3,6-diphenyl-1,4-diketopyrrolo-[3,4-c]-pyrrole and 1.0 g of dihydroquinacridone are stirred for 2½ hours in 50 ml of concentrated sulfuric acid. The mixture is added dropwise with stirring onto ice-water in the course of about 10 minutes. The pigment suspension formed is stirred at 80° C. for 3 hours and is filtered off hot, the press cake is washed with hot water until neutral and dried at 80° C. in a vacuum drying cabinet, and the material obtained is pulverized. This gives 8.0 g of an orange-coloured solid solution pigment whose X-ray diffraction diagram differs from the X-ray diffraction diagram of the corresponding physical mixture of the abovementioned starting materials. In plastics and paints this solid solution pigment produces very strong orange colourings having excellent fastness properties.

EXAMPLE 9

Example 8 is repeated, except that the 1.5 g are replaced by 3.0 g of 3,6-diphenyl-1,4-diketopyrrolo-[3,4-c]-pyrrole, the press cake washed until neutral is suspended once more in 200 ml of water, 2.0 g of $NiSO_4 \cdot 6H_2O$ are added to the pigment suspension, the pH is brought to 8.7 with 10% strength aqueous sodium carbonate solution, precipitating basic $NiCO_3$ onto the pigment, the suspension is filtered off, and the press cake is washed with water, dried and pulverized, affording an orange-coloured solid solution pigment whose X-ray diffraction diagram differs from the X-ray diffraction diagram of the corresponding physical mixture of the abovementioned starting materials.

In plastics and paints it produces very strong orange-tinged red colourings having very good light, heat and migration fastness properties.

EXAMPLE 10

A ball mill having a capacity of about 1 liter and containing 1.5 kg of steel balls (diameter: 1.2 cm) and 150 g of nails (length=3 cm) as grinding elements is charged with 4.0 g of γ-quinacridone, 0.6 g of dihydroquinacridone and 0.6 g of 3,6-di(4-chlorophenyl)-1,4-diketopyrrolo-[3,4-c]-pyrrole, 0.7 ml of tetrachloroethylene, 0.3 g of the isopropylamine salt of benzenedodecylsulfonic acid and 20 g of aluminium sulfate ($Al_2(SO_4)_3$15–18 $H_2O$). The tightly closed mill is rolled for 6 hours at room temperature on a roller gear table. The grinding stock is then separated from the grinding elements and stirred for 2 hours at 70° C. in a solution of 2.5 ml of concentrated sulfuric acid in 500 ml of water. The pigment is isolated by filtration, the filter cake is washed with hot water until neutral and free from salt, dried at 80° C. in a vacuum drier, and the dried goods are pulverised, affording 4.9 g of a red solid solution pigment whose X-ray diffraction pattern differs from that of the corresponding physical mixture of the above mentioned starting materials. Incorporation of the solid solution pigment so obtained in plastics and varnishes gives strong red colorations of excellent fastness properties.

EXAMPLE 11

The procedure of Example 10 is repeated, using 3.1 g instead of 4.0 g of γ-quinacridone, 1.1 g of 4,11-dichloroquinacridone instead of 0.6 g of dihydroquinacridone, and 1.0 g instead of 0.6 g of 3,6-di(4-chlorophenyl)-1,4-diketopyrrolo-[3,4-c]pyrrole, to give a red solid solution pigment whose X-ray diffraction pattern differs from that of the corresponding physical mixture of the above mentioned starting materials. Incorporation of the solid solution pigment so obtained in plastics and varnishes gives very strong red colorations of excellent fastness to heat, light, migration and weathering.

EXAMPLE 12

The procedure of Example 11 is repeated, using 3,6-diphenyl-1,4-diketopyrrolo-[3,4-c]pyrrole instead of 3,6-di(4-chlorophenyl)-1,4-diketopyrrolo-[3,4-c]pyrrole, to give a solid solution pigment of comparably good fastness properties.

EXAMPLE 13

A glass vessel is charged with 100 ml of tertamyl alcohol and nitrogen is slowly introduced. To the tertamyl alcohol are added 3.7 g of sodium and then 0.2 g of the sodium salt of bis(2-ethylhexyl)sulfosuccinate as emulsifier. The mixture is slowly heated to 95°–102° C. and, with efficient stirring, the metal is dissolved in the alcohol. The resultant solution is cooled to about 90° C. and 9.0 g of γ-quinacridone and 2.4 g of 3,6-diphenyl-1,4-diketopyrrolo-13,4-c]pyrrole are added thereto. The mixture is stirred for 2 hours at 100°–105° C. and the suspension of the pigment is charged into water while simultaneously introducing and then removing the organic solvent by distillation. The resultant pigment suspension is stirred for 30 minutes at 95° C. and filtered hot. The filter cake is washed with water until neutral, dried, and the product is pulverised, affording 11.5 g of a red solid solution pigment whose X-ray diffraction pattern differs from that of a corresponding mixture of the above mentioned starting materials. Incorporation of the solid solution pigment so obtained in plastics and varnishes gives strong red colorations of excellent fastness properties.

EXAMPLE 14

A mixture of 130 g of steatite balls of 8 mm in diameter, 47.5 g of alkyd melamine baking finish consisting of 60 g of alkyd resin ®BECKOSOL 27-320 (Reichhold Chemie AG) 60% in xylene, 36 g of melamine resin ®SUPER-BECKAMIN 13-501 (Reichhold Chemie AG) 50% in xylene:butanol (2:1 mixture), 2 g of xylene and 2 g of ethylene glycol monomethyl ether, and 2.5 g of the solid solution pigment obtained in Example 1 are dispersed in a 200 ml capacity glass flask with a twist-off cap on a roll stand in the course of 120 hours. After the steatite balls have been separated off, 2.4 g of the full tone mixture thus dispersed are mixed with 60 g of titanium dioxide ®KRONOS 59 (Kronos Titan GmbH) and a further 24.0 g of the above alkyd melamine baking finish. The mixture obtained is sprayed onto aluminium panels and subsequently baked at 130° C. for 30 minutes. This gives red colourings having excellent fastness properties.

EXAMPLE 15

A mixture of
130 g of steatite balls (diameter: 8 mm)
45.5 g of a thermosetting acrylic finish consisting of
41.3 g of acrylic resin ®VIACRYL VC 373, 60% (VIANOVA Kunstharz AG),
16.3 g of melamine resin ®MAPRENAL TTX, 55% (HOECHST AG),
32.8 g of xylene,
4.6 g of ethylglycol acetate,
2.0 g of butyl acetate and
1.0 g of ®Silikonöl A, 1% in xylene (BAYER AG), and
2.5 g of the solid solution pigment obtained in Example 2 are dispersed in a 200 ml glass flask with a twist-off seal on a roll stand in the course of 72 hours. After the steatite balls have been separated off, 8.0 g of the full tone mixture thus dispersed, 0.6 g of aluminium paste ®ALCOA (60–65% Al content, Aluminium Corp. of America), 1.0 g of methyl ethyl ketone and 18.4 g of the abovementioned thermosetting acrylic finish are thoroughly mixed, and the resulting mixture is sprayed onto aluminium panels and subsequently baked at 130° C. for 30 minutes. This produces very strong red metallized coatings having excellent fastness properties.

EXAMPLE 16

A mixture of 1.0 g of the solid solution pigment obtained in Example 6, 1.0 g of antioxidant (IRGANOX ® 1010, CIBA-GEIGY AG) and 1000 g of polyethylene HD granules (®VESTOLEN A 60-16, HUELS) is premixed in a glass flask on a roll stand for 15 minutes. The mixture is then extruded in two passes on a single-shaft extruder, and the granules thus obtained are injection moulded at 220° C. in an injection moulding machine (Allround Aarburg 200) to sheets and subsequently compressed at 180° C. for 5 minutes. The pressed sheets have strong orange shades with excellent fastness properties.

EXAMPLE 17

0.6 g of the solid solution pigment obtained in Example 8 is mixed with 67 g of polyvinyl chloride, 33 g of dioctyl phthalate, 2 g of dibutyltin dilaurate and 2 g of titanium dioxide, and the mixture is processed in a roll mill at 160° C. into a thin sheet in the course of 15 minutes. The orange PVC sheet thus produced is very deeply coloured and fast to migration and light.

EXAMPLE 18

1000 g of polypropylene granules (®DAPLEN PT-55, Chemie LINZ) and 20 g of a 50% pigment preparation consisting of 10 g of the solid solution pigment obtained in Example 4 and 10 g of Mg-behenate are thoroughly mixed in a mixing drum. The granules thus treated are melt-spun at 260° to 285° C. Red fibres having very good light and textile fastness properties are obtained.

We claim:

1. A solid solution of pyrrolo-[3,4-c]-pyrroles and quinacridones which contains (a) at least one compound of the formulae

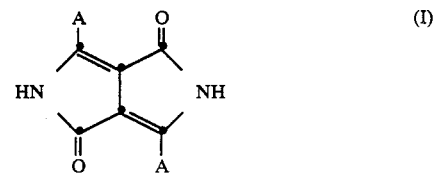

(I)

or

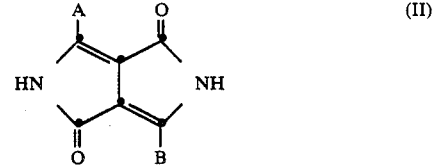

(II)

in which A and B are independently of each other one of the groups of the formulae

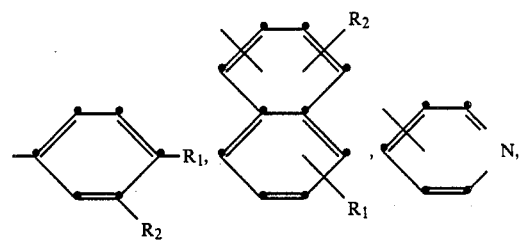

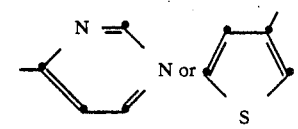

in which $R_1$ and $R_2$ are independently of each other hydrogen, halogen, $C_1$–$C_5$-alkyl, $C_1$–$C_5$-alkoxy, —$SR_3$, —$N(R_3)_2$ —$CF_3$, —CN or a group of the formulae

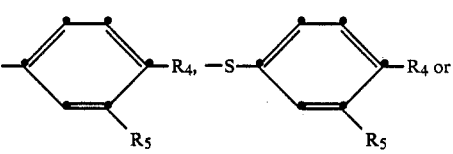

-continued

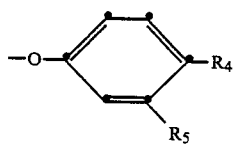

R$_3$ is C$_1$–C$_5$-alkyl and R$_4$ and R$_5$ are independently of each other hydrogen, halogen, C$_1$–C$_5$-alkyl, C$_1$–C$_5$-alkoxy, —SR$_3$ or —CN, and (b) at least one linear quinacridone compound of the formulae

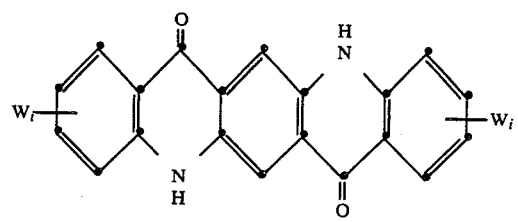

(III)

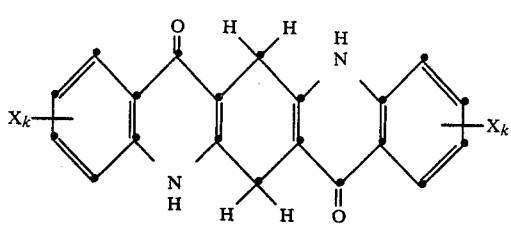

(IV)

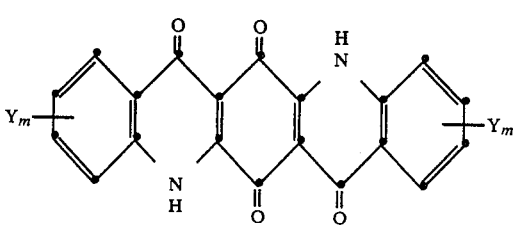

(V)

or

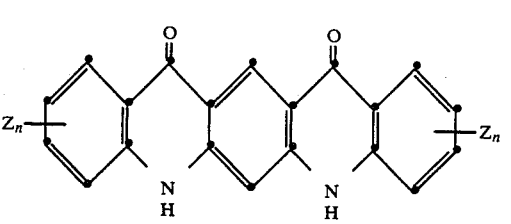

(VI)

in which W, X, Y and Z are independently of one another halogen, C$_1$–C$_5$-alkyl, C$_1$–C$_5$-alkoxy and i, k, m and n is zero, 1 or 2, the X-ray diffraction diagrams of the solid solutions differing from the sum of the X-ray diffraction diagrams of the individual components.

2. A solid solution according to claim 1, which contains at least one compound of the formulae I or II with the meaning indicated in claim 1 and a quinacridone compound of the formula III in which W is chlorine or methyl and i is zero or 1.

3. A solid solution according to claim 1, which contains at least one compound of the formulae I or II with the meaning indicated in claim 1, a quinacridone compound of the formula V in which m is zero and a quinacridone compound of the formula IV in which k is zero.

4. A solid solution according to claim 1, which contains at least one compound of the formulae I or II with the meaning indicated in claim 1, a quinacridone compound of the formula V in which m is zero and a quinacridone compound of the formula III in which i is zero.

5. A solid solution as claimed in claim 1, which contains at least one compound of the formulae I or II with the meaning indicated in claim 1 and one each of a quinacridone compound of the formulae III, IV and V in which i, k and m are zero.

6. A solid solution according to claim 1, which contains a compound of the formula I and at least one compound of the formulae III, IV, V or VI, the compounds of the formulae I, III, IV, V and VI having the meaning indicated in claim 1.

7. A solid solution according to claim 6, which contains a compound of the formula I in which A is a group of the formulae

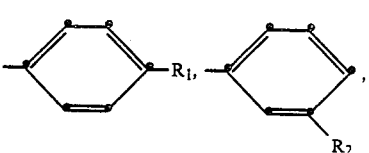

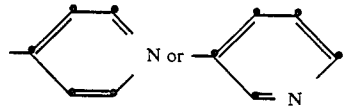

in which R$_1$ is hydrogen, chlorine, bromine, cyano, methyl, ethyl, tert.-butyl or phenyl and R$_2$ is hydrogen, chlorine, methyl or cyano.

8. A solid solution according to claim 1, which contains the two compounds of the formulae

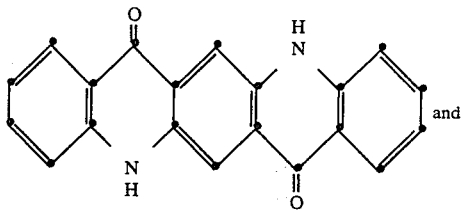 and

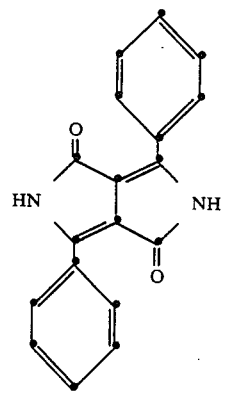

9. A process for colouring high molecular weight organic material by incorporating a solid solution according to claim 1.

10. A high molecular weight organic material containing a solid solution according to claim 1.

* * * * *